Nov. 21, 1967 — W. H. CHAFFEE ET AL — 3,353,884
COMPACT MULTI-PURPOSE DISPLAY MODULE
Filed March 8, 1966 — 2 Sheets-Sheet 1
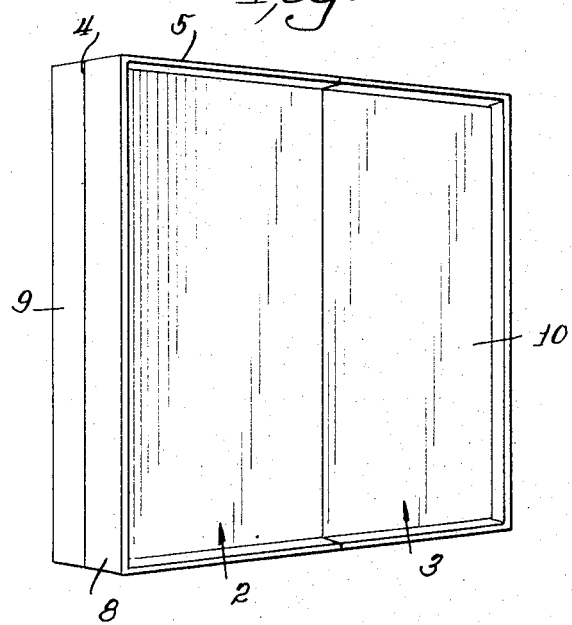
Fig. 1.
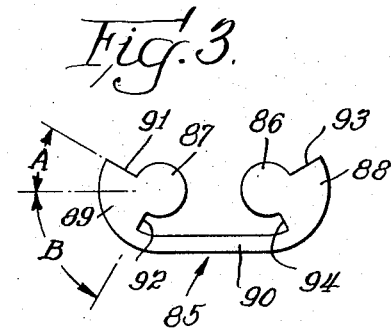
Fig. 3.
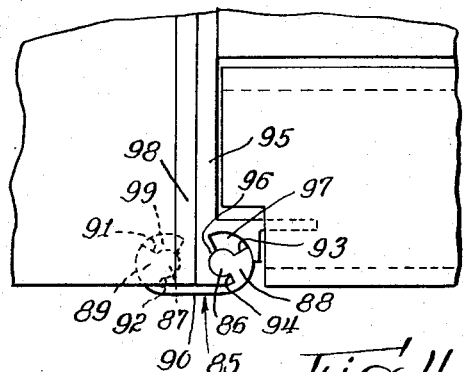
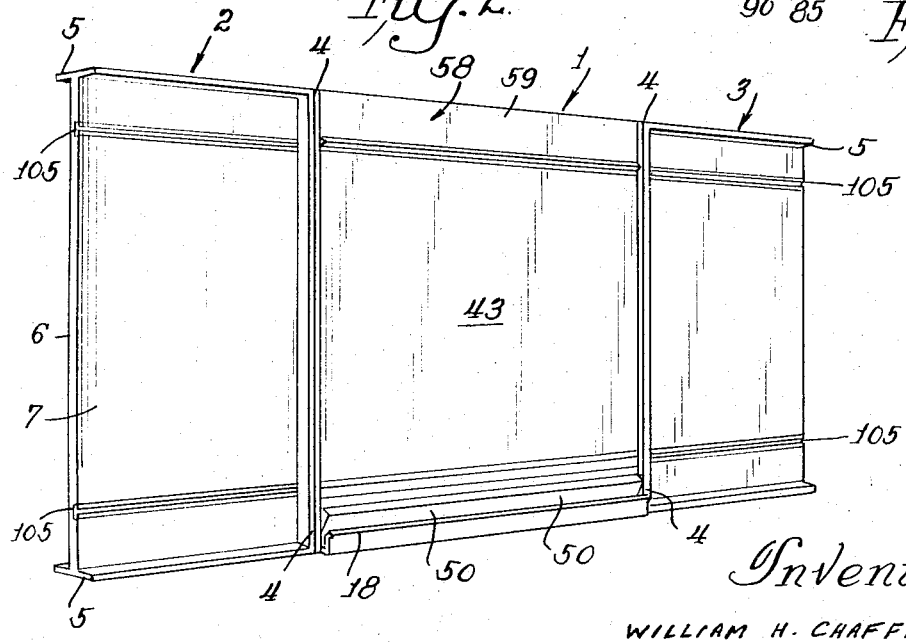
Fig. 2.
Fig. 4.
Inventors
WILLIAM H. CHAFFEE
ROBERT E. VOGELE
By Pettherbridge, O'Neill & Aubel
Attys.

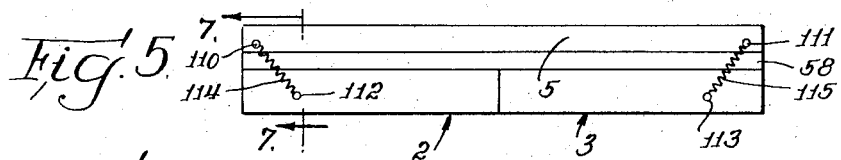
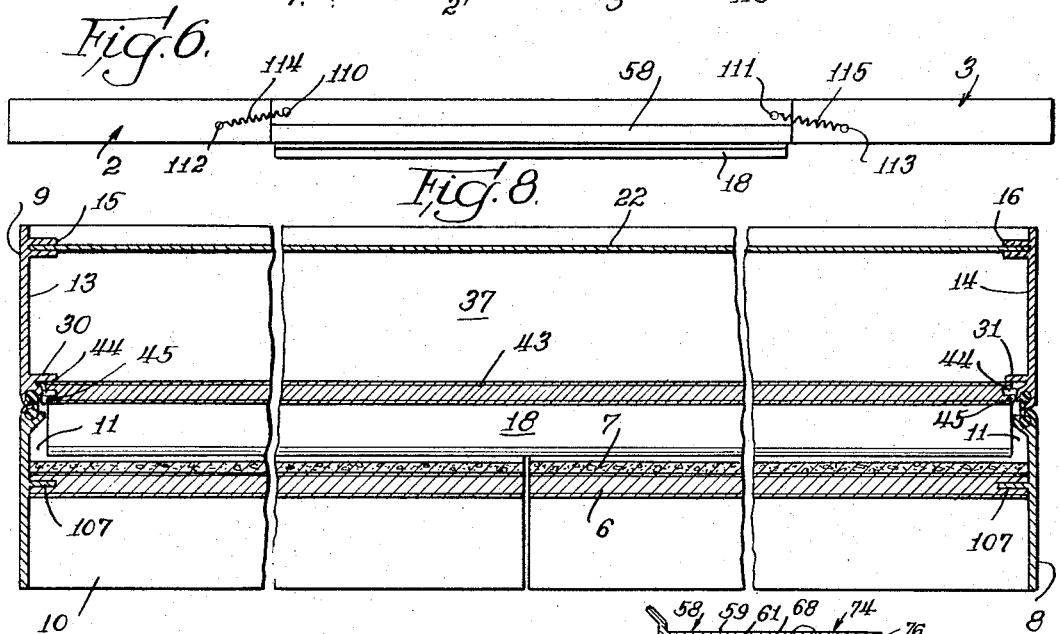
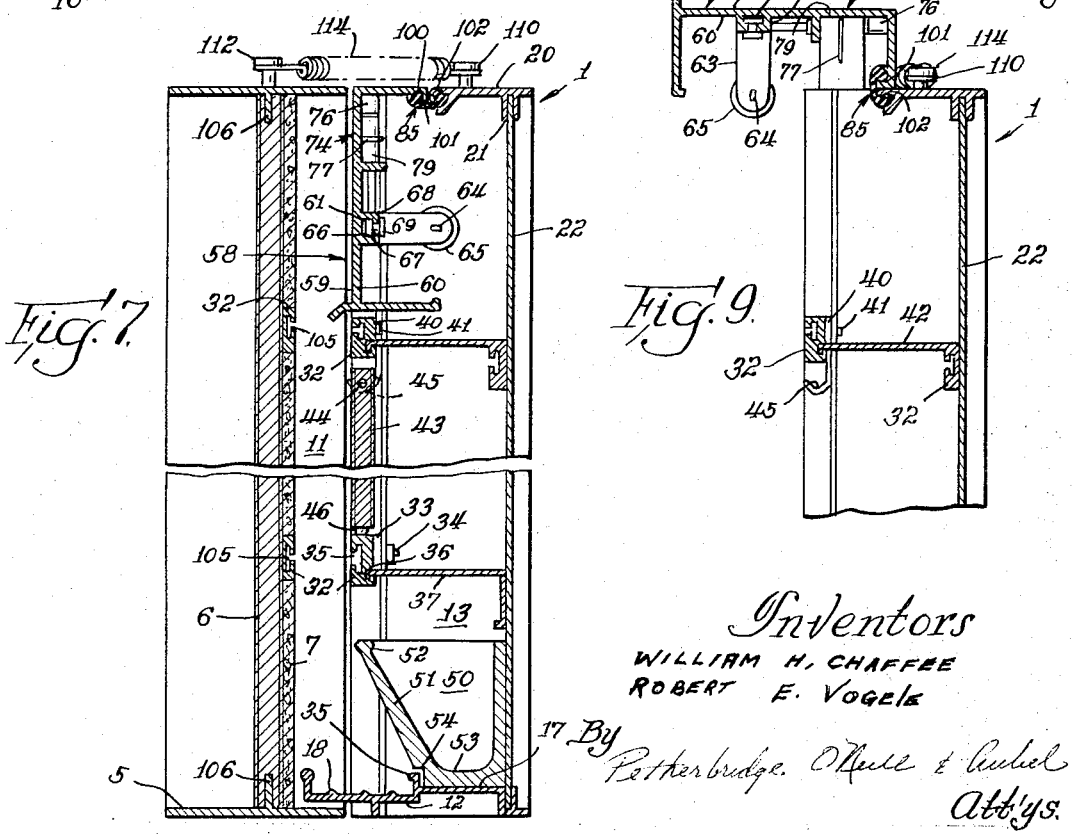

United States Patent Office 3,353,884
Patented Nov. 21, 1967

3,353,884
COMPACT MULTI-PURPOSE DISPLAY MODULE
William H. Chaffee, 5510 S. Country Lane Road, Hinsdale, Ill. 60521, and Robert E. Vogele, 4116 Gilbert Ave., Western Springs, Ill. 60558
Filed Mar. 8, 1966, Ser. No. 532,732
11 Claims. (Cl. 312—199)

ABSTRACT OF THE DISCLOSURE

A display module for facilitating the demonstration and presentation of visual objects while serving as a compact and appealing fixture when not in use. The display module consists of a primary display section bounded by an extruded supporting frame. An elongated channel member is pivoted to the primary section and can be opened or closed as desired. The pivotally mounted channel member is designed to carry a visual display unit such as a map, chart, etc. Doors are pivoted to the primary section of the display module and maintained in predetermined positions with respect thereto by resiliently responsive devices such as springs. The doors serve as supplementary display surfaces which can be used as required. A reversible panel element can be included and mounted on the frame of the primary section. This panel can be used for on-the-spot drawings, photographic projection, etc. The lower horizontal portion of the frame of the primary section is enlarged in cross-section to provide a support for large objects to be displayed, or for storage of demonstration of displayed objects.

---

This invention relates to a compact display module and more particularly to a viewing apparatus for facilitating the visual presentation of ideas.

All phases of modern business have followed the trend of increasing use of various means to visually present a communication of ideas in all phases of business, including graphic and diagrammatic presentation of ideas for sketches, a variety of displays, maps, motion pictures, film strips and slides. Generally, a combination of bulky, hard to handle, easels, movie screens, map cases, chalkboards and placards are used to convey such ideas. One of the primary purposes of the visual idea center of the invention is to combine all of the commonly used visual tools into a single attractive module in a manner such that a presentation can be made to a group utilizing a single module for the visual display of graphs, diagrams, sketches, maps, slides, film strips, motion pictures and pin-up displays. The module of the invention also includes a storage arrangement which permits the storage of marking materials and hanging devices, as well as an integral storage area for sheets, placards, maps and other large bulky objects.

The visual idea center or module of the invention is generally wall-mounted for use although it can be mounted upon a stand or table when required and readily transported from one place to another for display purposes. The module is ordinarily formed with a large central or primary display section which contains a concealed map or pull-down type display element which is contained in a rotatable member at the top of the module. A large multi-purpose reversible panel is centrally mounted in the primary display section and has one side treated for writing or sketching with water soluble crayons or marking implements which can be easily erased with a damp cloth. The opposite surface of the panel is provided with a mat finish having a white tone which can be used effectively as a screen for the projection of films and slides. This panel can be readily removed and reversed to switch from sketching to projection or can be wholly removed from the primary display section and a shelf which is normally used as part of the panel support can be used as a shelf for three dimensional or other displays. The primary display section is also provided with tip-out storage drawers which can contain a variety of marking instruments, pins, tacks, etc. and other display supporting elements. The tip-out storage drawers are supported upon a shelf which extends from the section in a manner such that the drawers when tilted outwardly, rest upon the extension and when tilted back to their normal upwardly open position, serve as a means for displaying marking instruments.

Horizontally extending aluminum channels are provided between the vertical frame portions of the primary display section and serve as supports for horizontally adjustable brackets which are used for supporting graphs, diagrams and other such visual displays.

A pair of doors are hinged to opposite sides of the primary display section by novel plastic one-piece flexible hinge devices. Tension springs are connected to each of the doors and are anchored to the frame or the primary display section in a manner such that the doors are resiliently biased in either their fully opened or fully closed position to prevent the accidental movement of the doors. The doors are generally provided with a cork surface which is exposed and visible when the doors are in their open position and faces towards the primary display unit when the doors are in closed position. Each of the doors is provided with aluminum channels which are aligned with the channels of the primary display section and also carry horizontally adjustable brackets for connecting sheets or placards at one time or another thereto. The doors, therefore, in their fully opened position, serve to greatly increase the capacity of the module for visual presentations.

The door sections of the module are fabricated with a generally I-shaped cross section configuration which provides a large recessed surface area opening outwardly when the doors are closed and a comparable recessed area opening inwardly when the doors are closed which will thereby permit a certain amount of object projection from the primary display section which can still be enclosed by the module when the doors are closed. When the doors are in open position, the exposed recessed surface areas convey a highly desirable three-dimensional effect to matter displayed thereon.

The visual idea center or compact multi-purpose display module of the invention therefore provides a single unit combining all of the paraphernalia previously required for effective visual communication. When the module is closed, an attractive decorative element for conference room or office is provided. When the module is open, it serves as a sketching board, a projection screen, a pin-up or tack-up display vehicle, a map holder, and a storage area for marking and pinning instrumentalities and display sheets and placards. Horizontally adjustable brackets permit a complete presentation on the open module of a large number of sheets or placards at the same time.

Various objects and advantages of the invention will hereinafter become more fully apparent from the following description of the drawings illustrating presently preferred embodiments thereof and wherein:

FIG. 1 is a perspective view of the visual idea center or module of the invention with the doors thereof in closed position;

FIG. 2 is a perspective view of the module of the invention illustrating the primary display section and doors in open position;

FIG. 3 is a top plan view of a hinge device of the invention;

FIG. 4 is a top plan view illustrating a hinge device of the invention in operative relationship with a pair of hinged elements;

FIG. 5 is a top plan view of the module of the invention with the doors in closed position;

FIG. 6 is a top plan view of the module illustrating the doors thereof in open position;

FIG. 7 is a cross-sectional view of the module of FIG. 5 taken along lines 7—7 thereof;

FIG. 8 is a transverse sectional view taken along lines 8—8 of FIG. 7; and

FIG. 9 is a partial vertical sectional view of the top portion of the primary display section illustrating the map carrying channel member in raised supported position.

Referring particularly to FIG. 2, the visual idea center or compact module of the invention is shown to basically comprise a primary display section, generally designated 1, flanked by a left door section 2 and a right door section 3, each being hinged at 4 by a novel hinge arrangement, which will be discussed subsequently, to the primary section. With the doors 2 and 3 in open position, as shown in FIGS. 2, 4 and 7, the door sections have a generally I-shaped cross-section. The horizontal segments 5 of the I's which form the top and bottom frame portions respectively of the doors 2 and 3 are connected by flat vertical composite panels 6. The construction employed in fabricating these panels utilizes a conventional honeycomb core over which flat parallel cover sheets are applied. For added strength, the panel portions bordering the periphery thereof are reinforced with a wood frame into which screws and other fastening means can be readily secured. In the module of the invention, a cork or other similar surface layer 7 is bonded to the door panel surfaces. These cork surfaces become exposed when the doors are in open position. The cork surface provides a means permitting sheets or placards to be pinned or tacked to the exposed surfaces of the doors. As is shown in FIG. 1, when the doors 2 and 3 are in closed position, a frame element 8 connects the top and bottom horizontal segments 5 and forms an essentially continuous surface therewith. When the doors are in closed position, it can be seen that the connecting frame elements 8 of the respective doors are in generally flush alignment with the corresponding frame surfaces 9 of the primary display section 1 and serve to fully enclose the forward facing portions of this section. The I-configuration of the doors as shown in FIG. 1, provides a substantial recessed area 10 formed by the closed doors which produces a three-dimensional effect and which can be readily used to provide an attractive reminder of the company using the device or it can be decorated to blend into the decor of the room in which the module is ordinarily used. The inwardly facing surface of the doors opposite recessed area 10 provide a recessed area 11 which permits storage of cards or other objects supported on the shelf or bottom rail 12 of the primary display section 1 while the apparatus is closed, and it permits the securement of relatively bulky objects to the primary display section while the unit is closed and in transit.

The primary display section is preferably fabricated from a number of extruded aluminum segments which are assembled to form the frame of the section. The frame portions of the left and right doors are also fabricated from extruded aluminum segments which are assembled to provide the supporting frame for the doors. The construction of the primary display section can be best seen in FIGURES 7, 8 and 9. As is shown in FIG. 8, the section is defined by a bottom rail 12 and a pair of vertically upstanding side rails 13 and 14. Each of the side rails is provided with a laterally opening panel supporting channel 15 and 16, respectively, formed at the rearwardmost ends of the side rails. The bottom rail 12 includes a drawer support channel 17 and an upwardly opening chalk rail 18, both of which extend substantially the length of the bottom rail. The extrusion forming the bottom rail also includes an upwardly opening panel supporting channel 19 which is located adjacent to the drawer support channel 17. The outer frame of the primary display section is completed by a top rail 20 which is assembled to upstanding side rails 13 and 14 to form with bottom rail 12 a section having a generally rectangular shape. Top rail 20 is formed with a downwardly opening panel supporting channel 21 which is located opposite to and in alignment with the channel 19 of bottom rail 12. When the rails are assembled to form the frame of the section, a back panel 22, which can be of honeycomb, laminated or solid construction, is held in position with respect to the frame by aligned channels 15, 16, 19 and 21.

The forwardmost or extended end of each of the side rails 13 and 14 are inwardly flanged at 30 and 31 respectively. These flanges are vertically elongated and extend substantially the vertical length of each of the rails. They also project toward each other across the display section and are disposed in opposed parallel alignment.

A pair of horizontally spaced and elongated S-shaped hook guide and securement members 32, as can be best seen in FIG. 7, span primary display section 1 at levels spaced above bottom rail 12 and below top rail 22. The bottom member 32 is spaced at one end from flange 30 by a spacer 33 and is secured to the flange 30 by a bolt 34 passing through the spacer and flange. The opposite end of bottom member 32 is similarly spaced from and connected to flange 31 to provide an outwardly facing hook channel 35 extending horizontally across section 1. The channel is positioned on the section in a manner such that it will be in continuous and parallel alignment with corresponding channels on doors 2 and 3 when in open condition. The inward opening L-shaped channel 36 of S-shaped member 32 is adapted to receive and support the outermost flanged end of a shelf 37. Shelf 37 is shown to be secured at its opposite end directly to back panel 22.

Spaced above and in parallel alignment with the lower S-shaped member 32 is a second such member which has a hook channel similarly aligned with corresponding channels on the doors. Utilizing a spacer 40, the top member is secured by a bolt 41 to flange 30 as shown in FIG. 7. A similar attachment (not shown) connects member 32 to flange 31. The inward opening L-shaped channel 36 of the upper member 32 supports the outermost flanged end of an upper shelf 42 which is similar to shelf 37. In this shelf installation, however, shelf 42 is supported and secured between back panel 22 and another S-shaped member 32.

Shelves 37 and 42 define with back panel 22 and side rails 13 and 14 a large area for storage or for use in connection with 3-dimensional displays. As is shown in FIG. 7, this area becomes completely enclosed when insert panel 43 is supported between the upper and lower S-shaped members 32. This insert panel is designed for diversified usage. The panel 43 is reversible. One side of the panel is treated for writing or sketching with water soluble crayons or marking implements which can easily be removed with a damp cloth or sponge. The other flat surface of the panel is provided with a white tone mat finish which will serve effectively as a projection screen for use in connection with movies, slides, film strips, etc. The individual using the display module for an oral or visual presentation can, therefore, produce sketches and diagrams on one surface and almost instantly, by reversing the exposed panel surface, can move into a projected portion of his program.

As can be seen in FIG. 8, the width of insert panel 43 is of a dimension sufficient to produce the engagement of a portion of the back thereof along its vertical edges with the outermost facing flange edges 30 and 31 of side rails 13 and 14. These edges thereby serve as backstops and in connection with the upper and lower S-shaped members 32 serve as a frame when an insert panel is positioned between them. As is shown in FIG. 7, a pin 44 projects laterally a short distance from the vertical edge of panel 43 near its top. The pin rests in a V-shaped cradle 45 connected to flange 30 and a corresponding pin on the opposite edge of panel 43 is connected to flange 31. This permits the pivoting of the panel about the axis of the pins to facilitate removal and reversal of the panel. Along the bottom edge of the panel 43, as shown in FIG. 7, a pair of spaced spring-loaded balls or detents 46 are provided. These detents serve to resiliently but firmly support the pivotable panel when in use and also facilitate the ready removal and reversal of the insert panel.

Referring particularly to FIGS. 2, 7 and 8, it can be seen that a pair of laterally extending tip-out drawers 50 are carried by the drawer support channel portions 17 of the bottom rail 12. Each of the drawers 50 is formed with a generally U-shaped configuration wherein one of the legs 51 thereof extends in an outwardly inclined direction. The upper edge of leg 51 is formed with an inwardly directed lip 52 to prevent pencils, chalk, erasers or other implements from rolling out when the drawer is tipped or rotated (counterclockwise as viewed in FIG. 7) for selection of an implement. It can also be seen in FIG. 7 that the junction of leg 51 and base 53 of the drawer 50 is provided with a notch 54 which acts in conjunction with a generally circular elongated projection 55 extending vertically from channel 17 to produce a pivot for the drawer.

The chalk rail 18, in addition to forming a rest for the drawer 50 when tipped out, also serves as a storage place for instruments used in connection with presentations and as a support for large illustrations, charts, etc.

With particular reference to FIGS. 7 and 9, and the illustrations of the top portion of the primary display section 1, it can be seen that a portion of this section is adapted to carry a pull-down type of display such as a map or graphic chart. Such a map or chart is carried by a generally U-shaped elongated channel member forming a housing 58. This housing 58 is pivoted to top rail 20 to permit the housing to be rotated counter-clockwise from the fully closed position shown in FIG. 7 to the fully open position illustrated in FIG. 9. As shown in FIG. 2, the outer surface 59 of base leg 60 of housing 58 is designed to conform aesthetically to the over-all unit when doors 2 and 3 are opened and housing 58 is in closed position. In closed position, the outer surface 59 of housing 58 establishes an essentially planar relationship with respect to the exposed surfaces of panel 43 and S-shaped members 32 in a manner such that a substantial space is provided between the inner door surface when closed and the planar surface of display section 1.

The surface of base leg 60 opposite normally exposed surface 60 of the leg is formed with a laterally extending slot 61 which is open at both ends of the leg. A pair of map hangers, generally designated 62, are inserted into slot 61 and are free to slide laterally in the slot. The map hangers 62 shown in FIGS. 7 and 9 consist of enlarged depending elements 63, one of which can be provided with a rectangular aperture 64 and the other with an aligned circular aperture (not shown) for receipt of the ends of a typical map or pull-down chart 65. Other commonly used means can be used in connection with elements 63 for mounting a map or chart on the elements. The end of each of the elements 63 opposite the apertures 15 flanged at 66 with a constricted portion 67 being formed between flange 66 and element 63 to permit introduction of the flange 66 into slot 61. Flange 66, therefore, can be inserted into slot 61 at an end thereof and is laterally slidable in the slot. The overhanging walls 68 defining slot 61 maintain flange 66 in the slot and restrict its movement to lateral motion. A set screw 69 is threaded through each of the flanges 66 of the map hangers 62 and serves to permit the securement of the hanger in any preselected position by threading the end of set screw 69 into the base of the slot, thereby urging flange 66 into rigid immovable contact with the overhanging walls 68 of slot 61.

When it is desired to attach a typical map, such as 65 in FIG. 9, to the map hanger, one end of the map is inserted into the appropriate aperture of one of the hangers 62. The set screw 69 of the other hanger is loosened and the hanger may then be moved laterally until the opposite end of the map is inserted into the aperture of that hanger. The set screw is tightened at this point and the map is securely locked in position and is ready for immediate use. Also, where desired, the set screws of both hangers may be loosened, and the map and hangers may be simultaneously moved to produce any desired centering effect with respect to the module.

A pair of opposed spring biased latches, generally designated 74, one of which is shown in FIGS. 7 and 9, are pivotally mounted at opposite ends of housing 58 and serve to support and maintain the housing in open position when a map or chart carried by the housing is being used. The latches 74 consist of flanged plates 75 pivotally mounted on pivots 76 adjacent the laterally outermost edges of housing 58. The latches are biased in a normally open position, as shown in FIG. 9, by scissors type springs 77 having body portions wrapped around pivots 76 and disposed within grooves 78 of the latches 74. One of the projecting ends of the springs are urged against base leg 60 of housing 58 while the other is urged against the body of each of the latches. Since the pivoting ends of the latches are formed with flat surfaces 79, shown in FIG. 7, and which are in generally normal relationship to the inner surface of base leg 60 of housing 58 when the latches are in the closed position shown, the surfaces 79 are pivoted into firm face-to-face contact with the inner surface of base leg 60 when the housing 58 is pivoted to this open position of FIG. 9 and the latches 74 are urged into their normally open positions. The substantial flat surface-to-surface contact between latch surfaces 79 and the inner surface of base leg 60 prevents the springs 77 of the latch mechanism from moving the latches beyond a position which forms a right angle with respect to base leg 60.

The latches 74 are designed to project vertically downwardly in the manner shown in FIG. 9. When housing 58 is raised to its open position, the latches 74, which have been maintained in closed position against their spring bias by flanges 30 and 31 of side rails 13 and 14, against which they rest when housing 58 is in closed position, are pivoted 90° in response to their spring bias to their open positions. The lower flanged portions 80 of the latches, when in this open position, are designed to firmly rest upon the uppermost extremities of flanges 30 and 31 and to firmly support the housing and its appurtenances when in open position. To close the housing 58, the latches 74 are manually urged against their spring bias, and the housing is rotated downwardly to its closed position where the latches are maintained in closed position by the flanges 30 and 31.

Referring particularly to FIGS. 3 and 4, the novel pivot or hinge arrangement of the invention, generally designated 4, is most clearly illustrated. The hinge element 85 is formed from plastic, and in the preferred embodiment from a flexible vinyl. The hinge element 85, as used in the visual display module of the invention and as can be seen in FIG. 2, is an elongated extruded member which normally extends the length of the edges which it joins. The extruded element is formed with a pair of axially spaced partially cylindrical inner segments 86 and 87. The partial cylindrical inner segments 86 and 87 define circular segments of about 270°, as viewed in FIG. 3, having the same radial dimensions. Partial cylindrical segments 88 and 89 project from segments 86 and 87, respectively, across the incomplete portions of segments 86 and 87 and in opposed relationship. These latter segments are 90° portions of circular segments and are coaxial with respect to segments 86 and 87. A web 90 connects the outermost portions of segments 88 and 89 to form a one-piece integral hinge element. As can be seen in FIG. 3, when a line is passed through the centers of segments 86 and 87, the angle A is defined by this bisecting line and the radial wall 91 of segment 89 is 30°; and the angle B defined by the bisecting line and the radial wall 92 of segment 89 is 60° thereby providing a 90° segment. The walls 93 and 94 of segment 88 are similarly oriented with respect to the bisecting line and provide substantially a mirror image relationship between segments 86–88 and 87–89.

FIG. 4 shows a hinge element 85 of the invention inserted in slots provided in the side rail 13 of primary display section 1 and the door 2 bordering the edge of the rail. As explained above, the slots and the hinge elements extend substantially the entire vertical length of the rail and the door edge to provide a continuous hinge arrangement 4 between the top and the bottom of the display module. The hinge arrangement for the right door 3 is substantially identical to that employed for door 2. A hinge arrangement in open position is shown in FIG. 4 and in closed position in FIG. 8.

The outermost end 95 of side rail 13, extending beyond flange 30 as shown in FIGS. 4 and 8, is formed with a slotted configuration adapted to receive one of the segments of hinge element 85. The slot includes a semicircular central portion 96 for pivotal receipt of segment 86 of hinge element 85. The outer segment 88 projecting from segment 86 is accommodated in an incomplete semicircular slot portion 97 which is open at one end to permit connecting web 90 to project from the slot. The innermost edge 98 of door 2 is provided with a slot 99 corresponding to that of the adjacent slot arrangement of the outermost end 95 of side rail 13. Segments 87 and 89 can therefore be rotatably positioned in this adjacent slot. Door 3 and adjacent side rail 14 are similarly hinged to provide a complete two door unit.

In operation, the opposed outer segments 88 and 89 can be freely pivoted on segments 86 and 87, respectively, about the slots in which they are positioned during the opening and closing of the doors. Due to the configuration of the segments and slots in which they are positioned, the doors can be moved from fully open to fully closed positions without danger of the elements 85 becoming separated from the slots. The extruded vinyl hinge elements are economical to produce, long-lasting and durable in use, and provide a unit having two doors and a central section but conveying the pleasing appearance of being a unitary structure rather than a three section unit.

Map or chart housing 58, as shown in FIGS. 7 and 9, embodies a modified form of the hinge arrangement 4 of the arrangement. In this arrangement, slot 100 formed in the flanged end 101 of housing 58 maintains segments 87 and 89 against pivotal movement whereas the slotted end 102 of top rail 20 is identical to that of end 95 of side rail 13 and functions in a similar manner of permit the rotation of segments 86 and 88 therein. This embodiment, in restraining segments 87 and 89 from movement, acts to produce a degree of tension in web 90 between the opposed segments when housing 58 is opened. This tension assists the firm securement of latches 74 in engagement with flanges 30 and 31 to produce a more rigidly supported housing.

Referring back to FIGS. 2 and 7, the composite cork surfaces 7 of the doors are provided with horizontally extending hook guide channels 105 into which a hook or chart supporting means 105a can be slidably inserted. These channels are preferably aligned with channels 35 provided by S-shaped members 32 on primary display section 1. By aligning the channels in this manner, continuity of display can be more easily maintained during the course of a presentation utilizing the module of the invention. It is also preferred in producing doors according to the invention to provide vertical panel supporting flanges 106 which extend upwardly from the horizontal bottom door segments 5 and downwardly from the horizontal top segments 5 to more firmly hold panel 6 between these segments. As illustrated in FIG. 8, vertical connecting elements 8 of the doors 2 and 3 can be similarly flanged 107 and inserted into the respective panels 6 to more rigidly secure them in place.

FIGS. 5, 6 and 8 best illustrate the resilient means employed for maintaining doors 2 and 3 in either a fully open or fully closed position. A pair of bushings 110 and 111 are secured near opposite ends of top rail 20 of display section 1 as shown in FIGS. 5 and 6. A bushing 112 is secured to the top segment 5 of door 2 in diagonally spaced relationship with respect to bushing 110 when the door is in the closed position shown in FIG. 5. A bushing 113 is similarly located with respect to bushing 111 on door 3. As illustrated, springs 114 and 115 interconnect bushings 110–112 and 111–113, respectively. The diagonal relationship between the interconnected bushings causes the doors to be firmly urged against the primary section when closed.

When the doors are in the open position shown in FIG. 6, the flat edges 8 and 9 of the respective doors are placed in a compressive relationship and are maintained thereby in open position. The connecting points of the springs therefore have been placed in a manner which will tend to eliminate the tendency of the doors to assume other than a fully opened or closed condition.

Various modes of carrying out the invention are contemplated as being within the scope of the following claims particularly pointing out and distinctly claiming the subject matter which is regarded as the invention.

We claim:

1. A display module for facilitating visual presentations comprising a primary display section, the primary section being provided with a supporting frame, an elongated channel member pivotally mounted upon the frame for rotation between open and closed positions, a visual display means supported within the channel of the channel member, a plurality of doors cooperably pivoted to the frame of the primary display section to enclose the primary display section and the channel member when the doors are in closed condition and to act to increase the display capacity of the primary display section by providing secondary display sections when in open condition, and channel defining means provided on the doors and on the primary display section, the channel defining means of the doors being located in parallel alignment with the channel defining means of the primary section when in open condition and being adapted to retain movable display supporting means to produce correlated visual displays.

2. A display module for facilitating visual presentations comprising a primary display section, the primary section being provided with a supporting frame, an elongated channel member pivotally mounted upon the frame for rotation between open and closed positions, a visual display means supported within the channel of the channel member, a door pivotally connected to the frame of the primary display section adapted to enclose the primary section when closed and to cooperate with the primary section when open to provide a secondary section for visual presentation, and a panel element reversibly and removably connected to the frame of the primary display section, the panel element having a pair of opposed generally parallel face surfaces which can be reversed with respect to the front of the display section, each of the face surfaces of the panel being disposed in generally parallel alignment with respect to the plane of the front of the primary display section.

3. A display module for facilitating visual presentations comprising a primary display section, the primary section being provided with a supporting frame, an elongated channel member pivotally mounted upon the frame for rotation between open and closed positions, a visual display means supported within the channel of the channel member, a door pivotally connected to the frame of the primary display section adapted to enclose the primary section when closed and to cooperate with the primary section when open to provide a secondary section for visual presentation, and removable rotatable container members are supported in upwardly opening condition upon the base of the frame of the primary display section for rotation to a laterally opening condition in use, the container members being adapted for storage of display instrumentalities, the container members having inwardly directed lip portions for retaining display instrumentalities when the members are rotated to a laterally open position, and means are provided on the supporting frame extending therefrom for supporting the container members in their rotated laterally opening condition, the container supporting means serving as auxiliary display instrumentality support means when the container members are in their upwardly opening condition.

4. A display module for facilitating visual presentations comprising a primary display section, the primary section being provided with a supporting frame, an elongated channel member pivotally mounted upon the frame for rotation between open and closed positions, a visual display means supported within the channel of the channel member, a door pivotally connected to the frame of the primary display section adapted to enclose the primary section when closed and to cooperate with the primary section when open to provide a secondary section for visual presentation, and spring-biased pivotable latch means are mounted upon the elongated channel member and act to firmly support the channel member and the visual display means supported within the channel of the channel member when the channel member is rotated to open position.

5. A display module for facilitating visual presentations comprising a primary display section, the primary section being provided with a supporting frame, an elongated channel member pivotally mounted upon the frame for rotation between open and closed positions, a visual display means supported within the channel of the channel member, a door pivotally connected to the frame of the primary display section adapted to enclose the primary section when closed and to cooperate with the primary section when open to provide a secondary section for visual presentation, and the visual display means supported within the channel is rotatably supported on slide members having portions disposed for longitudinal sliding movement in a longitudinally extending slot provided in a wall defining the channel and having portions depending from the portions disposed for sliding movement and engaging the display means.

6. A display module for facilitating visual presentations comprising a primary display section, the primary section being provided with a supporting frame, an elongated channel member pivotally mounted upon the frame for rotation between open and closed positions, a visual display means supported within the channel of the channel member, a door pivotally connected to the frame of the primary display section adapted to enclose the primary section when closed and to cooperate with the primary section when open to provide a secondary section for visual presentation, and the pivotal mounting of the elongated channel member on the frame comprises a unitary flexible hinge element having a first portion immovably secured to the channel member, and a second portion rotatably connected to the frame, the first and second portions being connected by a web portion to permit the channel member to be rotated a predetermined distance to resist further rotation beyond that distance and to assist in maintaining the channel member in a predetermined position.

7. A display module for facilitating visual presentations comprising a primary display section, the primary section being provided with a supporting frame, an elongated channel member pivotally mounted upon the frame for rotating between open and closed positions, a visual display means supported within the channel of the channel member, a door pivotally connected to the frame of the primary display section adapted to enclose the primary section when closed and to cooperate with the primary section when open to provide a secondary section for visual presentation, and the pivotal connection of the door to the frame of the primary display section comprises an elongated one piece flexible hinge element having a first portion rotatably connected to the frame, and a second portion rotatably connected to the door.

8. A display module according to claim 2, wherein the frame of the primary display section includes a back panel which is disposed in parallel relationship with respect to the plane of the front of the primary section, and a horizontal member extending forwardly from the back panel, the horizontal member serving as a supporting member for the panel element and as a shelf for 3-dimensional display when the panel is removed from the primary section.

9. The display module of claim 1, wherein the first portion comprises a first partial cylindrical segment having a second co-axial partial cylindrical segment projecting therefrom, the first portion being disposed in a slot in the frame rotatably receiving the first portion and restraining the first portion from withdrawal therefrom during rotation, the second portion comprises a first partial cylindrical segment having a second co-axial partial cylindrical segment projecting therefrom, the second portion being disposed in a slot in the door rotatably receiving the first portion and restraining the first portion from withdrawal therefrom during rotation, and a web interconnects the second partial cylindrical segment across the opening between the door and the frame.

10. The display module of claim 1 wherein the unitary flexible hinge element extends substantially the entire length of the door and adjacent frame to provide a continuous hinge arrangement from top to bottom of the door.

11. A compact display module for presenting visual displays comprising
   a primary display section having a generally rectangular supporting frame,
   a channel member pivotally mounted to the top portion of the rectangular supporting frame of the primary display section, the channel defined by the channel member opening toward the bottom portion of the section when pivoted to open position with a portion of the member extending outwardly of the plane of the front of the display section, the channel opening toward the back portion of the section when pivoted to closed position with the member lying substantially flush with respect to the plane of the front of the frame of the display section,
   a visual display means collapsibly mounted in the channel of the channel member and being concealed within the channel when not in use, the display means being at least partially withdrawable from the channel when opened toward the bottom portion of the section for display,
   a panel element reversibly and removably connected to the primary display section adjacent the channel member, the panel being generally flush with the plane of the front of the display section when positioned in the primary and reversed positions,
   storage means provided on the frame of the primary display section for storage of various display instrumentalities and located within the plane of the front of the frame of the display section,
   a generally rectangular first door section hinged to one side of the primary display section,
   a second generally rectangular door section hinged to the side of the primary display section opposite the first door,
   the door sections having generally I-shaped configurations with the connecting leg of the I of each door being disposed in alignment when the doors are in closed condition with respect to the primary display section,
   the door sections, when disposed in fully open condition with respect to the primary section, having the planes thereof defined by the outer edges of the connected legs of the I's thereof in generally flush alignment with the plane of the front of the frame of the display section and providing secondary display sections augmenting the capacity of the primary section,
means defining a generally horizontal channel on the frame of the primary section located adjacent the channel member thereof and adapted to movably retain display supporting means thereon,
the door sections having channel means provided on the connecting legs of the I configuration thereof, disposed in generally parallel continuous alignment with the channel defining means of the primary section when the doors are disposed in open position to movably retain display supporting means thereon,
first resilient tensioning means connected to the top of the frame of the primary section and to the top portion of the first door to resiliently maintain the door in predetermined positions, and
second resilient tensioning means connected to the top of the frame of the primary section opposite the first resilient tensioning means and to the top portion of the second door to resiliently maintain the door in predetermined positions.

References Cited

UNITED STATES PATENTS

| | | | |
|---|---|---|---|
| 523,814 | 7/1894 | Hussey | 312—199 X |
| 1,241,615 | 10/1917 | Farrow | 312—199 X |
| 1,881,333 | 10/1932 | Steiner | 312—235 X |
| 2,546,590 | 3/1951 | Ferrel | 16—164 X |
| 2,602,252 | 7/1952 | Shinn | 312—200 X |
| 3,015,840 | 1/1962 | Eskridge et al. | 16—172 |
| 3,178,243 | 4/1965 | Dimeyer | 312—200 |
| 3,191,218 | 6/1965 | Skiba | 16—163 |
| 3,208,807 | 9/1965 | Becker | 312—200 |

CASMIR A. NUNBERG, *Primary Examiner.*